United States Patent [19]

Colombo

[11] 4,324,493
[45] Apr. 13, 1982

[54] MIXER-COOLER DEVICE FOR THE EXTRUSION OF THERMOPLASTIC FOAMS

[75] Inventor: Roberto Colombo, Turin, Italy

[73] Assignee: Lavorazione Materie Plastiche L.M.P-S.p.A., Turin, Italy

[21] Appl. No.: 166,874

[22] Filed: Jul. 8, 1980

[30] Foreign Application Priority Data

Aug. 6, 1979 [IT] Italy ............................. 68617 A/79

[51] Int. Cl.³ .......................... B29B 1/06; B29B 3/00
[52] U.S. Cl. .................................... 366/79; 366/149; 366/305; 425/378 R
[58] Field of Search ........................ 366/79, 82, 83, 84, 366/85, 87, 89, 90, 144, 147, 302, 305, 307, 318, 322; 425/378 R

[56] References Cited

U.S. PATENT DOCUMENTS

| | | | |
|---|---|---|---|
| 3,416,774 | 12/1968 | Fritsch | 366/147 X |
| 4,222,729 | 9/1980 | Ragazzini et al. | 366/144 X |
| 4,235,581 | 11/1980 | Anders | 366/144 X |

FOREIGN PATENT DOCUMENTS

| | | | |
|---|---|---|---|
| 1197438 | 7/1965 | Fed. Rep. of Germany | 366/79 |
| 2082464 | 12/1971 | France | 366/79 |

*Primary Examiner*—Philip R. Coe
*Attorney, Agent, or Firm*—Sughrue, Mion, Zinn, Macpeak & Seas

[57] ABSTRACT

A mixer-cooler device for the extrusion of thermoplastic foams comprising: a pair of radially foraminous tubular cylindrical blocks, clamped in axial alignment against opposite faces of a barrier disk by means of a headplate for connection with an extruder barrel and a headplate for connection with an extrusion head, the disk having an axial circular aperture; an advancement screw sealingly rotatable within the blocks, connectable with a screw of the extruder to constitute an extension of this latter screw, the advancement screw having an intermediate barrier section sealingly rotatable in the aperture of the disk; a tubular casing sealingly connecting the two headplates to form a tubular collector channel embracing from the outside the foraminous zones of the two blocks; and a system of passages in the headplates, blocks and disk for the circulation of a coolant liquid for the two blocks.

9 Claims, 5 Drawing Figures

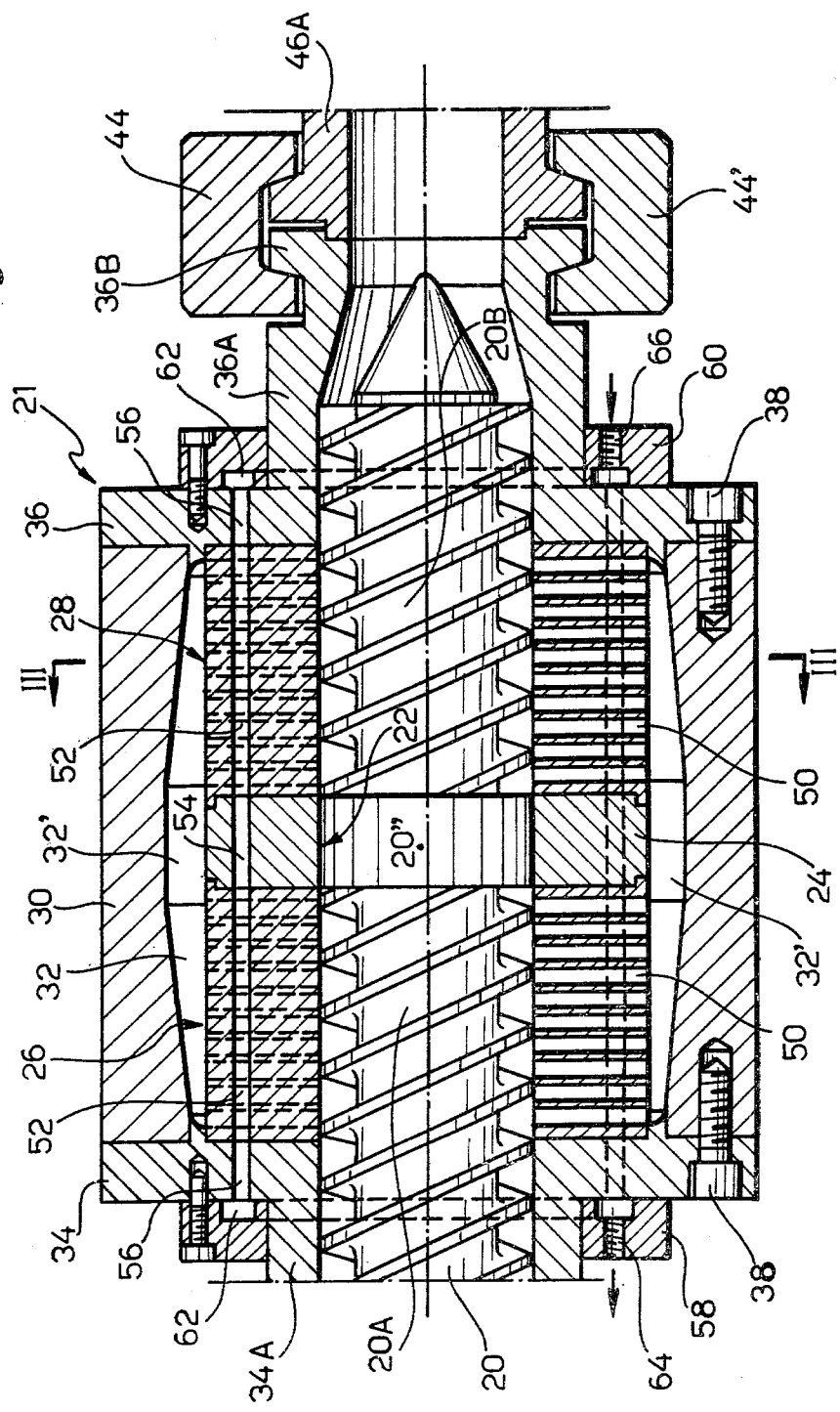

MIXER-COOLER DEVICE FOR THE EXTRUSION OF THERMOPLASTIC FOAMS

The present invention relates to the manufacture of extruded articles (for example sheets or tubes) of synthetic thermoplastic foam, for example polystyrene, polyethylene or polypropylene.

According to conventional technique, a thermoplastic resin is melted continuously under pressure in the barrel of an extruder with one or more screws, terminating with an extrusion head having a narrow extrusion opening, which is flat (for sheets) or circular (for tubes). In an intermediate section of the barrel there is continuously injected into the molten resin a volatile blowing agent, usually in a liquid state, for example "Freon" (R.T.M.) or pentane, and the extruder is designed in such a way as to dissolve the agent as uniformly as possible in the molten resin. Advantageously the resin can contain suitable nucleating agents, such as, for example, talc, citric acid and sodium bicarbonate in the form of very fine particles uniformly dispersed in the molten resin. On its path towards the extruder slit the molten material is subjected to a high pressure necessary to prevent the volatilization of the blowing agent. On passing out of the extrusion opening the material undergoes decompression to atmospheric pressure so that the blowing agent separates within the body of the material as bubbles, giving rise to the desired foam.

It is known that the quality of the foam thus obtained strongly depends on the extrusion temperature. If the extrusion temperature is too high the foam is collapsed and non-uniform, its specific gravity (density) is undesirably high with respect to the theoretically obtainable value and its mechanical strength is poor. As a general principle, the higher the percentage of the blowing agent in the molten material the lower should be the extrusion temperature because otherwise the viscosity of the just-extruded resin would be insufficient to oppose the destructive pressure of the gas which is liberated in the resin. Since, to obtain low density foams (lower than 0.1 g/ml), it is necessary to use substantial percentages of blowing agent, the problem of lowering the extrusion temperature assumes high importance.

Cooling of the extrusion head has until now been shown to be insufficient to obtain the desired result, mainly due to that the cellular structure of the foam thus obtained is coarse and far from being uniform. The arrangement until now most commonly used for obtaining a uniform structure is that of cooling the last section of the extruder barrel. For example, Italian Pat. No. 831,699 (and the corresponding British Pat. No. 1,231,535 and French Pat. No. 1600010) by the Applicant, describes an extruder for thermoplastic foam including at least one blowing agent injector in an intermediate region of the barrel containing the molten material, which region is followed by a first cooling zone comprising a water jacket, and by a second (final) cooling zone comprising a refrigerating coil fed by a refrigerator system. Even with such intense cooling, however, it is impossible to lower the temperature of the molten material to the value which would be necessary to obtain the optimum result. In fact, as the material advances through the cooling zone, its viscosity increases and therefore frictional heat due to the action of the screw or screws also increases; a stationary state therefore arises in which the temperature of the material no longer decreases whilst it is still a long way from the low value desired for the extrusion. It is possible partly to remedy this disadvantage by suitably reducing the speed of rotation of the screws; with this expedient, however, also the hourly productivity of the extruder is reduced. Another remedy consists in effecting the cooling in another extruder to which the first extruder feeds the molten material at elevated temperature and in which the screw or screws rotate at low velocity. The quality of the foam obtained in this manner is acceptable. However, the cost of operating the second extruder is only rarely lower than that of the first one, apart from the high investment cost.

The general object of this invention is to eliminate the above-mentioned disadvantages. In particular, an object of the invention is to provide a cooling system for the molten material, containing the blowing agent, in which the flow of material is subjected to a minimum of friction notwithstanding its viscosity increase, thereby to minimise the development of frictional heat, and in which at the same time a satisfactory homogenisation of the material subjected to the cooling is obtained so that at the moment of extrusion the material homogeneously has the desired low temperature. Another object of the invention is to provide a simple, compact device of low cost and economic running, able to realise the preceeding object. Still another object of the invention is to provide the said device in a form easily applicable to a conventional extruder of synthetic thermoplastic foam sections. Other objects and advantages will become apparent from the following description.

In accordance with the above, the invention provides a mixer-cooler device for extrusion of thermoplastic foam comprising: a pair of radially foraminous tubular cylindrical blocks, clamped in axial alignment against the opposite faces of a barrier disk by means of headplate for connection with the extruder barrel and a headplate for connection with the extrusion head, the said disk having an axial circular aperture; an advancement screw sealingly rotatable within the said blocks, connectable to a screw of the extruder to constitute an extension of the latter screw, the said advancement screw having an intermediate barrier section rotatable in the aperture of the said disk; a tubular casing sealingly connecting the two headplates to form a tubular collecting channel embracing from the outside the foraminous zones of the two blocks; and a system of passages in the said headplates, blocks and disk for the circulation of a cooling liquid for the two blocks.

One embodiment of the device according to the invention will now be described with reference to the appended drawings, in which;

FIG. 2A is an extension of FIG. 2 and illustrates in axial cross-sectional view the device according to this invention;

Figure 1:
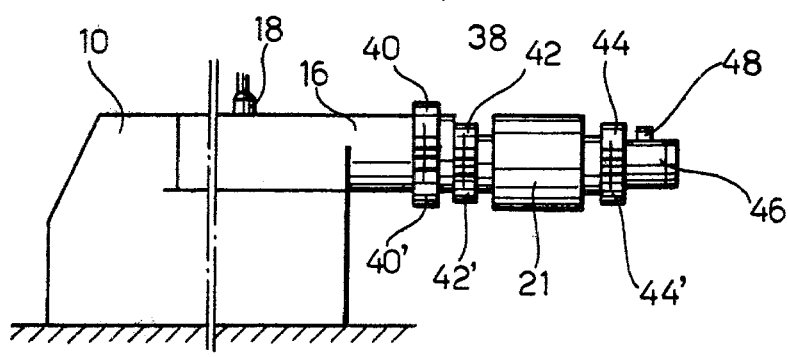
FIG. 1 is a side view of a thermoplastic foam extruder equipped with a device according to the invention.

In FIG. 1, reference 10 denotes an extruder which can have one or more screws. In the exemplified case the extruder having two co-rotating intermeshing screws denoted by 12 and 14 in FIG. 2. Into an intermediate section of the barrel 16 of the extruder there opens an injection device 18 for the blowing agent. The screw 14 ends in the usual way with a conical tip 14' (FIG. 2), whereas the free end of screw 12 has screwed thereinto by means of a threaded shank 20' the advancement screw of the device 21 according to the invention. The screw 20 is a double-thread screw and has a relatively long pitch in order to convey the entire flow of the material arriving from the two screws 12, 14 of the extruder. The pitch and diameter of the screw 20 are constant throughout its length.

As can be seen in FIG. 2A, a short intermediate section 20" of the screw 20 is not threaded, and this section is sealingly rotatable in the corresponding axial aperture 22 of a circular disk 24 to form a barrier against the direct passage of the material along the screw to beyond the disc 24. This section 20" delimits on the screw 20 a feed section 20A situated upstream, and a transfer section 20B situated downstream of the said section 20". If desired, the barrier section 20" may have a thread reverse to that of the screw, or whatever other configuration able to prevent at least substantially the said direct passage of material.

The opposite faces of the disk 24 have applied thereagainst, in axial alignment, two tubular cylindrical blocks 26, 28 of good head conducting metallic material, for example aluminium, in which are sealingly rotatable the respective sections 20A, 20B of the screw 20. The assembly of the blocks and the disk is surrounded by a tubular casing 30 which forms, around this assembly, a tubular collector channel 32 coaxial with the screw 20. The blocks 26, 28 are clamped against the disk 24 by centrally apertured circular headplates 34, 36 by means of bolts 38 screwed into the casing through the headplates.

Figure 2:
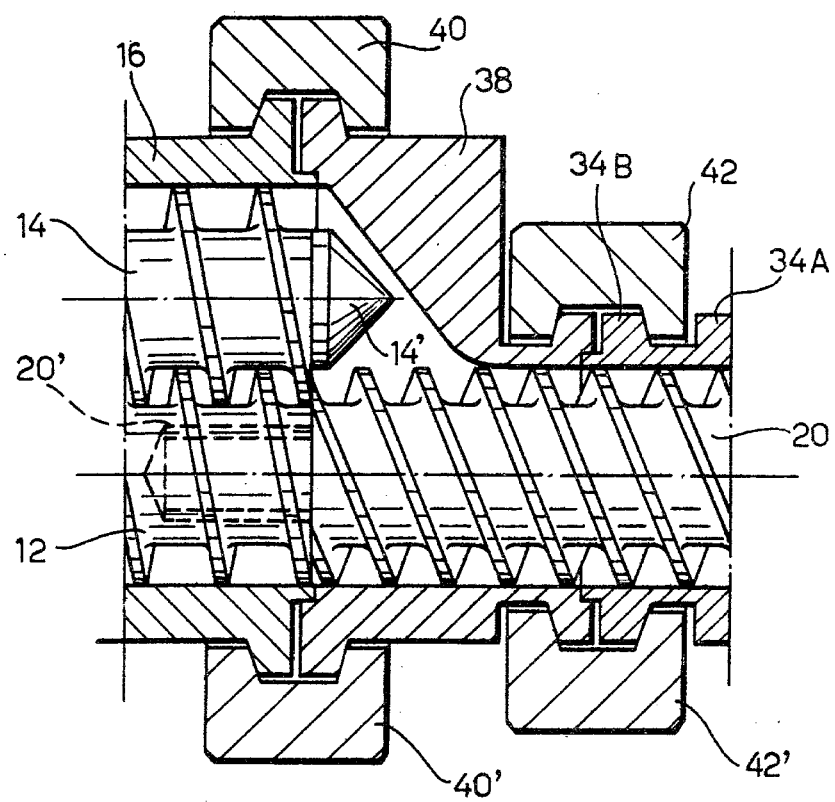
FIG. 2 illustrates in axial cross-section the zone of attachment of the device to the extruder barrel.

Each of the headplates 34, 36 has a tubular hub 34A, 36A respectively, directed outwardly, terminating with an attachment flange 34B, 36B respectively. The attachment of the device according to the invention to the barrel 16 of the extruder 10 is illustrated in FIG. 2. In this FIG. 2 reference 38 denotes an adapter flanged at its two ends and locked on the free end of the barrel 16 by means of two clamping half-collars 40, 40'. Similarly the flange 34B is locked on the adapter by means of two clamping half-collars 42, 42'. As is apparent from FIG. 2 the function of the adapter is to collect the flow of the material coming from the screw 14 and deliver it to the flow coming from the screw 12 in such a way that the resulting overall flow is conveyed by the advancement screw 20 constituting an extension of the screw 12. The hub 34A is internally circularly cylindrical and has the same inner diameter as the blocks 26, 28 and the disk 24, that is to say a diameter substantially equal to the outer diameter of the advancement screw 20.

Figure 2B:
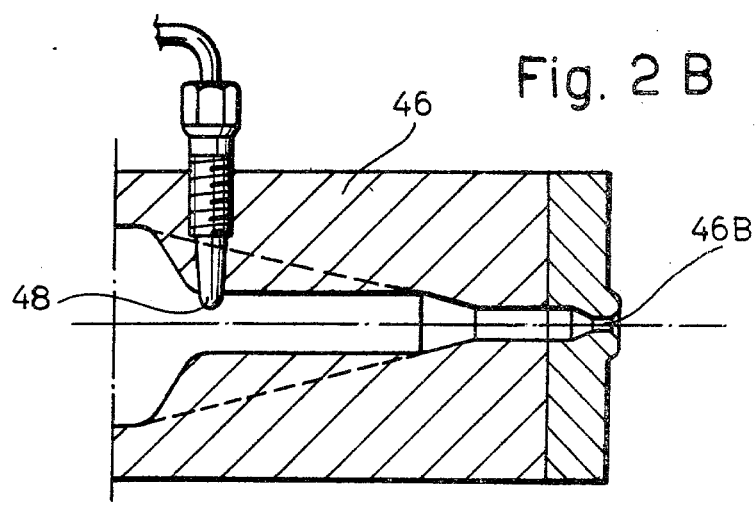
FIG. 2B is an extension of FIG. 2A and schematically shows an extrusion head fed through the device of FIG. 2A.

The section 20B (FIG. 2A) of the screw 20 penetrates for a short distance into the hub 36A of the headplate 36, and in this region the hub 36A has the same inner diameter as the block 28. The flange 36B of the hub 36A has attached thereto by means of clamping half-collars 44, 44', the inlet end 46A of an extrusion head 46 (FIG. 2B) terminating with an extrusion nozzle 46B of desired cross-section (circular, annular, flat slit, etc.). Into the head 46 penetrates a temperature probe 48 for the control of the extrusion temperature, and a similar probe (not illustrated) is provided in the adapter 32 for monitoring the temperature of the material at the inlet of the device 21 according to the invention.

The two blocks 26, 28 are preferably identical with one another and mounted in opposition on the disk 24 (FIG. 2A). Each of them has a large number of radial holes 50, preferably distributed in a plurality of circumferential rings following one another in axial direction. One of these rings is visible in FIG. 3. For clarity of illustration the ring represented in FIG. 3 includes only twelve holes 50 relatively distant from one another, but in practice it is desirable to have a denser distribution, for example 34 holes per ring in the case of a screw 20 with a diameter of 120 mm. Advantageously, the overall area (in transverse cross-section) of the holes in each block should amount to at least 50% of the inner cylindrical surface of the block. Moreover, preferably, the holes 50 are all of the same diameter.

Figure 3:
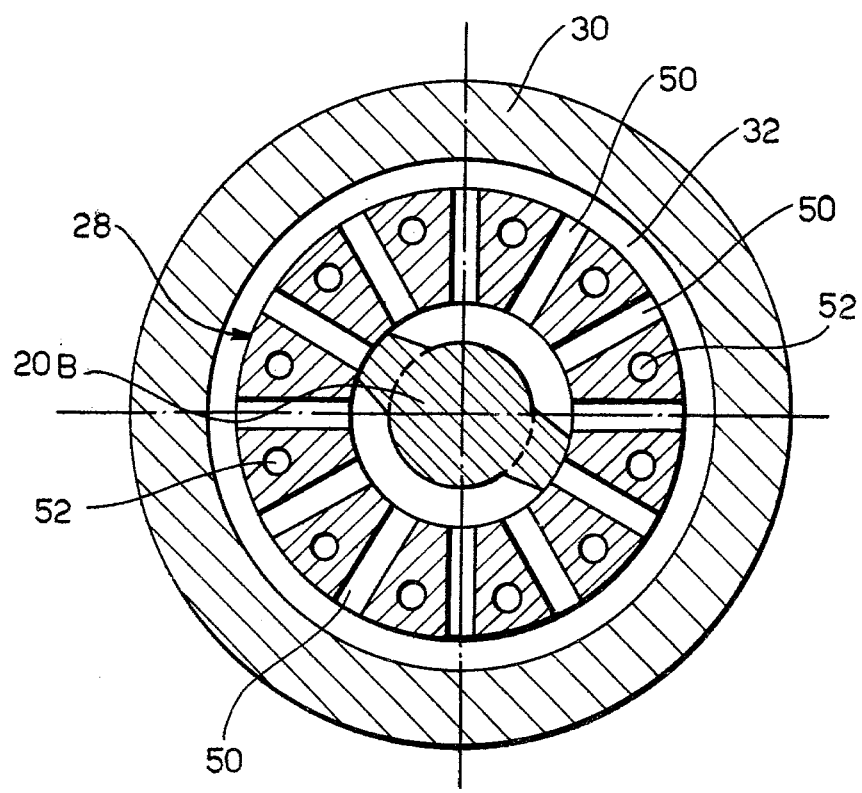
FIG. 3 is a transverse cross-sectional view on the line III—III of FIG. 2A.

Each block 26 and 28 is traversed in axial direction by a plurality of holes 52, which can be uniformly distributed between the holes 50 as can be seen in FIG. 3. With these longitudinal holes 52 there are aligned corresponding holes 54 in the disk 24 and further holes 56 in each of the headplates 34, 36. Against the outer face of each headplate there is sealingly bolted a collar 58 and 60, respectively, of C-profile, forming with the said face an annular chamber 62 communicating with the holes 56 in the headplate. Each of the collars has a threaded aperture 64, 66, for connection to a cooling liquid circuit (not illustrated), for example an oil circuit, so that, in operation, the blocks 26, 28 can be maintained at a convenient temperature whilst the material, urged by the feed section 20A of the screw 20, flows at first through the holes 50 of the block 26 in the form of individual narrow radial flows which are individually cooled by the block. These individual radial flows reunite and mix with one another in the collector channel 32 to form a single annular flow directed axially towards the block 28. At this point the material is again sub-divided into individual radial flows which traverse the holes 50 of the block 28 and are again individually cooled. At the outlet of block 28 these flows once again re-unite and mix with one another in an extremely efficient manner in as much as the inner surface of the block 28 is continually "swept" by the threads of the section 20B of the screw 20. This results in a very thorough homogenisation and the material thus homogenised is forwarded by the said section 20B to the extrusion head 46. The rate of circulation of the cooling liquid is regulated as a function of the temperature measured by the probe 48; if the temperature is too high the circulation is increased, and vice versa.

To obtain the best results it is advisable to observe several conditions of detail.

In the first place, irrespectively of the number of radial holes 50 in each of the blocks 26, 28, the diameter of the holes should not be less than 3 mm; otherwise there is a risk of a pressure drop which may be intolerable. In general, and depending upon the capacity of the extruder, the diameter of the holes 50 should be chosen in the range of 3 mm. (for capacities of 40-50 kg/h of processed material) to 10 mm. (for capacities of the order of 250 kg/h).

Moreover, the ratio between the length and diameter of the holes 50 is also relevant. It is preferable that this ratio (l/d) does not exceed about 12 and is not less than 4. The following table is intended to offer a practical guide:

| Hole Diameter (mm) | l/d | Preferred l/d |
|---|---|---|
| 3 | 4–7 | 5–6 |

-continued

| Hole Diameter (mm) | l/d | Preferred l/d |
|---|---|---|
| 5 | 6–10 | 7–9 |
| 6 | 7–11 | 8–10 |
| 8 | 7–12 | 8–10 |
| 10 | 7–12 | 8–11 |

Moreover, according to the invention, it is advisable to take into account the ratio between the overall area of the holes in each block and the "piston area" of the screw 20, the term "piston area" meaning the difference $$\pi R^2 - \pi r^2$$

where R is the radius of the thread of the screw 20 and r is the radius of the core of the screw. The said ratio should preferably be greater than 1 and preferably less than 2; otherwise, cooling worsens and the pressure drop across the device increases.

The homogenising effect of the device according to the invention obviously increases with increase of the number of holes 50 in each block. However, it also depends, in a not negligible manner, on the form and radial width of the collector channel 32. With excessive radial width the individual radial flows coming out from the block 26 join one another with little interference and therefore with scarce mixing. By adequately limiting the radial width of the collecting channel 32 the intensity of flow in this channel in the axial direction is increased and interference conditions between this flow and the individual radial flows leaving the block 26 can be so artificially created that homogenisation is improved. Preferably, assuming that the outer diameter of the blocks 26, 28 and of the disk 24 is constant (FIG. 2A), the radial width of the collector channel 32 increases from each of its two ends towards the central cylindrical zone 32' surrounding the disk 24. Yet again, preferably, the said width at each end of the channel amounts to 1–1.5 times the diameter of the radial holes 50 belonging to this end. Finally, preferably, the area of the channel in transverse cross-section at the said cylindrical zone 32' amounts to 0.9–1.5 times the overall area of the holes 50 in each block 26, 28. In these conditions the axial flow of material in the collector channel 32 is only influenced to a limited extent by the interference of local turbulence at each of the radial holes 50, so that the mutually opposing requirements of good homogenisation and low pressure drop are met in a satisfactory manner. It is to be noted that the term "low pressure drop" is indicative of a minimisation of friction with the consequent minimisation of the frictional heat, which is all to the advantage of the efficiency of cooling and homogenisation of the device according to the invention.

By way of example, with a screw 20 with a diameter of 120 mm. (core diameter 80 mm.) the following proportions can be suggested;

Blocks 26, 28:—length about 130 mm; outer diameter 260 mm; radial holes 50 of 7 mm. diameter distributed in 14 rings having each 34 holes. This results in: a ratio l/d = 10; total hole area 18.326 mm²; piston area 5.500 mm²; ratio between the two areas = 3.33.

Collector channel: radial width at each end = 10 mm; transverse area in the cylindrical zone 32' = 17.600 mm²; ratio between this area and the total area of the holes in each block = 0.96.

The thickness of the disc 24 equal to 50 mm.

The device 21 with these proportions can be applied to the applicants' twin-screw extruder RC 41/E to produce 180–220 kg/h of polystyrene foam with a screw velocity of 8.5–28 revolutions per minute. In tests performed to date, the device according to the invention (cooled with oil at 90°) resulted to be capable of homogeneously cooling 220 kgs per hour of material from about 140° C. to about 118° C. to produce a foam of uniform density in the range of 0.029–0.030 g/ml.

It is evident that the invention is not restricted to the embodiment described above. In particular, it could be convenient to make the core diameter of the screw 20 progressively increasing in the sections 20A and 20B towards the non-threaded section 20" over the whole length of the respective foraminous blocks 26, 28 or along a part of this length. Also the distribution and/or the diameter of the radial holes 50 could be variable, although the uniform distribution and diameter are preferable from at least the constructional point of view. The casing 30 could be externally finned to increase the dispersion of heat from the material flowing in the collector channel 32. However, it does not seem advisable to substantially rely upon the casing 30 for the purpose of cooling of the material since, with such cooling, there is the risk of the formation of a "cold skin" on the flow in the channel 32. Yet again, the diameter of the section 20" of the screw 20 and the diameter of the hole 22 in the disk 24 can be reduced, for example to the value of the diameter of the core of the screw 20; however, the design illustrated in FIG. 2A is preferred, as it allows an easy removal of the screw without having to dismantle the assembly.

What is claimed is:

1. A mixer device for the extrusion of thermoplastic material comprising:
    a barrier disc having a central axially extending circular aperture,
    a pair of cylindrical blocks having axially extending circular apertures disposed in axial alignment against opposite faces of said disc, each of said blocks having a plurality of radial holes extending therethrough,
    a tubular casing surrounding said disc and said blocks in concentric spaced relation to define a collector channel,
    a pair of head plates having central axially extending circular apertures connected to opposite ends of said casing and clamping said blocks against said disc,
    an advancement screw rotatably mounted in said circular apertures and having an intermediate barrier section sealingly rotatable in said barrier disc whereby material conveyed by said advancement screw from one end of said device to the other is forced outwardly through the radial holes in one block, axially over the outer periphery of said disc and inwardly through the radial holes in the other block, and
    passage means extending through said headplates, blocks and disc for the circulation of a coolant fluid.

2. A device according to claim 1, in which the overall area of the radial holes in each block amounts to at least 50% of the cylindrical surface of the block and is greater than the piston area of the screw.

3. A device according to claim 2, in which the said overall area amounts to at least twice the said piston area.

4. A device according to claim 1, 2 or 3, in which the diameter of the radial holes is from 3 to 10 mm. and in which the length/diameter ratio of the said holes is from 4 to 12.

5. A device according to claim 1, in which the radial width of the collector channel increases from each end of the channel towards a central cylindrical zone surrounding the disk.

6. A device according to claim 5, in which the said width at each end of the channel amounts to 1–1.5 times the diameter of the radial holes which open into this end.

7. A device according to claim 5, in which the area of the channel in transverse cross-section at the said central cylindrical zone amounts to 0.9–1.5 times the overall area of the holes in each block.

8. A device according to claim 1 in which, with the exception of the barrier section, the pitch and the outer diameter of the advancement screw are constant.

9. A device according to claim 1, in which the barrier section is a cylindrical non-threaded section sealingly rotatable in the aperture of the disk.

* * * * *